(12) United States Patent
Breeden et al.

(10) Patent No.: US 7,469,227 B2
(45) Date of Patent: Dec. 23, 2008

(54) RETAIL LENDING RISK RELATED SCENARIO GENERATION

(75) Inventors: Joseph L. Breeden, Glorieta, NM (US); Michael A. Smith, Phoenix, AZ (US); R. David Franklin, Santa Fe, NM (US)

(73) Assignee: Strategic Analytics, Inc., Santa Fe, NM (US)

( * ) Notice: Subject to any disclaimer, the term of this patent is extended or adjusted under 35 U.S.C. 154(b) by 1211 days.

(21) Appl. No.: 10/359,895

(22) Filed: Feb. 7, 2003

(65) Prior Publication Data

US 2003/0225659 A1 Dec. 4, 2003

Related U.S. Application Data

(63) Continuation-in-part of application No. 10/215,805, filed on Aug. 9, 2002, and a continuation-in-part of application No. 09/781,310, filed on Feb. 13, 2001.

(60) Provisional application No. 60/184,190, filed on Feb. 22, 2000, provisional application No. 60/310,845, filed on Aug. 9, 2001, provisional application No. 60/355,123, filed on Feb. 8, 2002.

(51) Int. Cl.
*G06Q 40/00* (2006.01)

(52) U.S. Cl. ................ 705/36 R; 705/35; 705/38; 705/37

(58) Field of Classification Search ........... 705/35, 705/36, 36 R, 37, 38

See application file for complete search history.

(56) References Cited

U.S. PATENT DOCUMENTS

| | | | | |
|---|---|---|---|---|
| 5,704,045 A * | 12/1997 | King et al. | ........... | 705/35 |
| 5,742,775 A * | 4/1998 | King | ........... | 705/38 |
| 5,806,048 A * | 9/1998 | Kiron et al. | ........... | 705/36 R |
| 5,812,987 A * | 9/1998 | Luskin et al. | ........... | 705/36 R |
| 5,940,812 A * | 8/1999 | Tengel et al. | ........... | 705/38 |
| 5,966,700 A * | 10/1999 | Gould et al. | ........... | 705/38 |
| 6,070,151 A * | 5/2000 | Frankel | ........... | 705/36 R |
| 6,078,903 A | 6/2000 | Kealhofer | | |
| 6,185,543 B1 * | 2/2001 | Galperin et al. | ........... | 705/38 |
| 6,202,053 B1 | 3/2001 | Christiansen | | |
| 6,233,566 B1 * | 5/2001 | Levine et al. | ........... | 705/36 R |
| 6,249,775 B1 * | 6/2001 | Freeman et al. | ........... | 705/36 R |
| 6,321,212 B1 * | 11/2001 | Lange | ........... | 705/36 R |

(Continued)

OTHER PUBLICATIONS

Reichert, Alan, The Potential for Portfolio Diversification in Financial Services. Economic Review. 2000. pp. 1-35.*

(Continued)

*Primary Examiner*—James P. Trammell
*Assistant Examiner*—Jamie H Swartz
(74) *Attorney, Agent, or Firm*—John S. Paniaguas; Katten Muchin Rosenman LLP

(57) ABSTRACT

Generation of risk-related retail lending portfolio scenarios is disclosed. A selected functional form is used to decompose vintage performance data into a maturation component, an exogenous component and vintage calibration parameters for the portfolio. Known exogenous drivers are extracted from the exogenous component to create a residual exogenous component. Monthly changes in the residual exogenous component are computed, and the distribution of monthly changes in the residual exogenous component is measured. This information is used to generate a number of random potential future scenarios for the residual exogenous component and, ultimately, for the generation of a number of forecasts for key portfolio drivers.

61 Claims, 13 Drawing Sheets

U.S. PATENT DOCUMENTS

| | | | |
|---|---|---|---|
| 6,405,179 B1* | 6/2002 | Rebane | 705/36 R |
| 6,832,205 B1* | 12/2004 | Aragones et al. | 705/10 |
| 6,850,907 B2* | 2/2005 | Lutnick et al. | 705/37 |
| 6,963,856 B2* | 11/2005 | Lutnick et al. | 705/37 |
| 7,120,598 B2* | 10/2006 | Ocampo | 705/35 |
| 7,249,080 B1* | 7/2007 | Hoffman et al. | 705/35 |
| 2001/0029477 A1* | 10/2001 | Freeman et al. | 705/36 |
| 2003/0115128 A1* | 6/2003 | Lange et al. | 705/37 |
| 2004/0006502 A1* | 1/2004 | Masiello et al. | 705/8 |
| 2004/0030629 A1* | 2/2004 | Freeman et al. | 705/36 |

OTHER PUBLICATIONS

"Arm Home Equity Loan Prepayment Model" by Howard Stern, Ph.D., Jul. 2000.

* cited by examiner

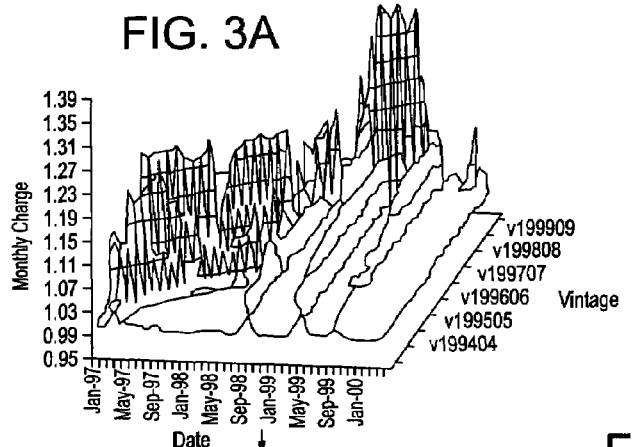
FIG. 3A
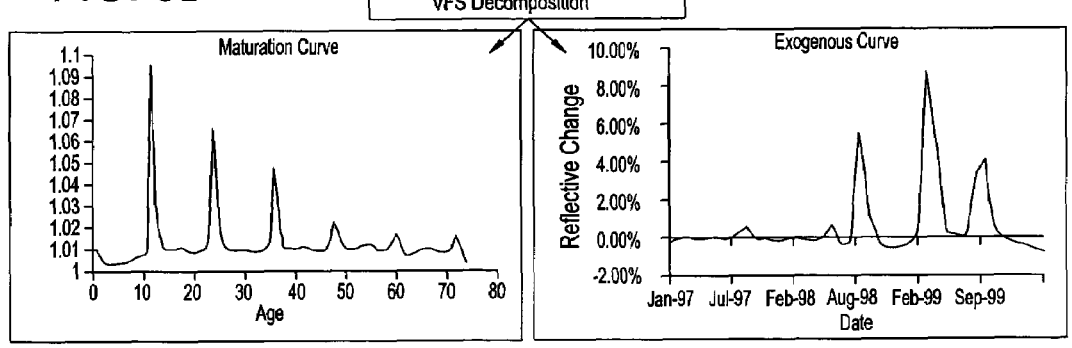
FIG. 3B
FIG. 3C

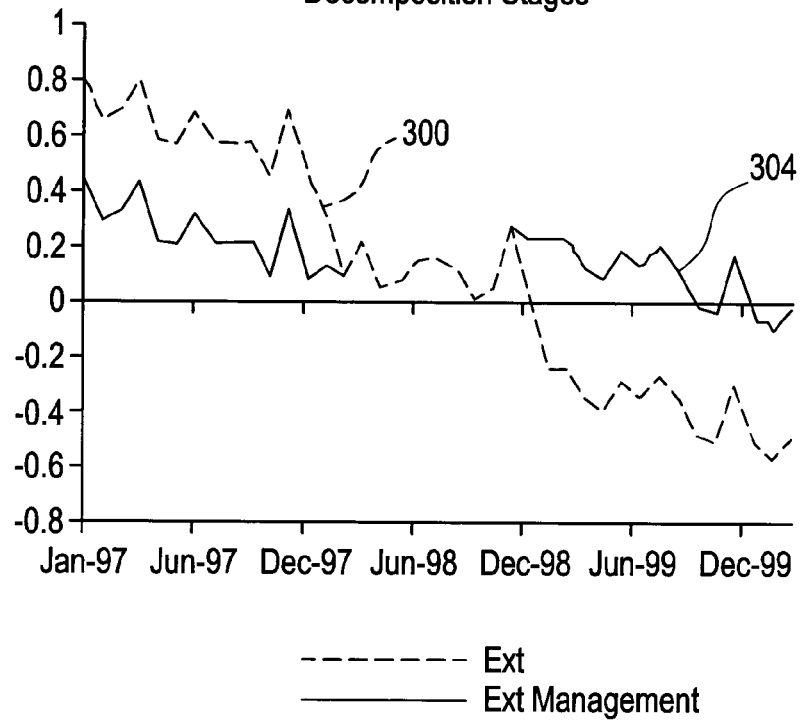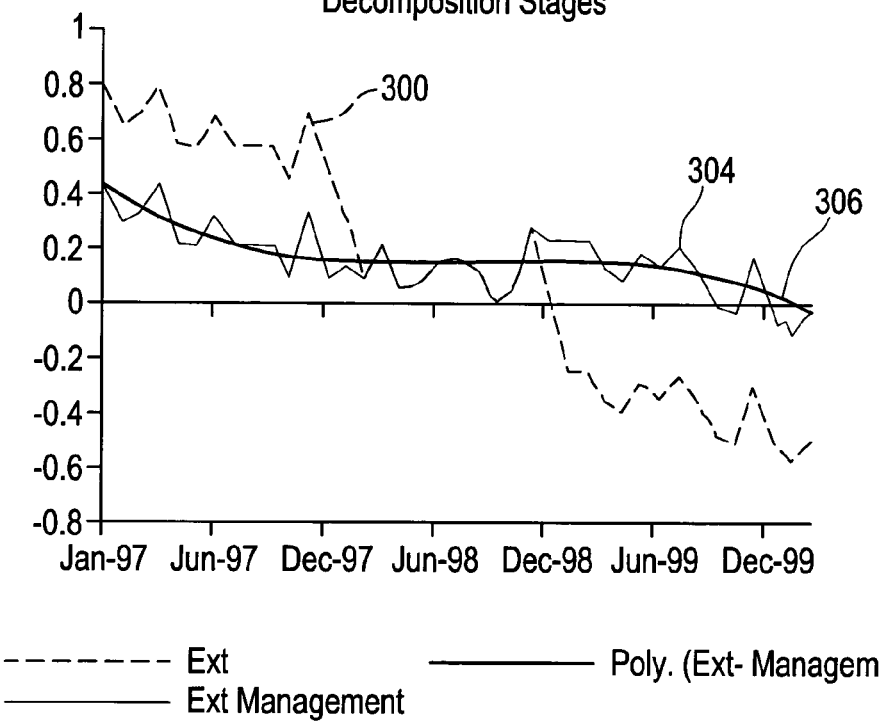

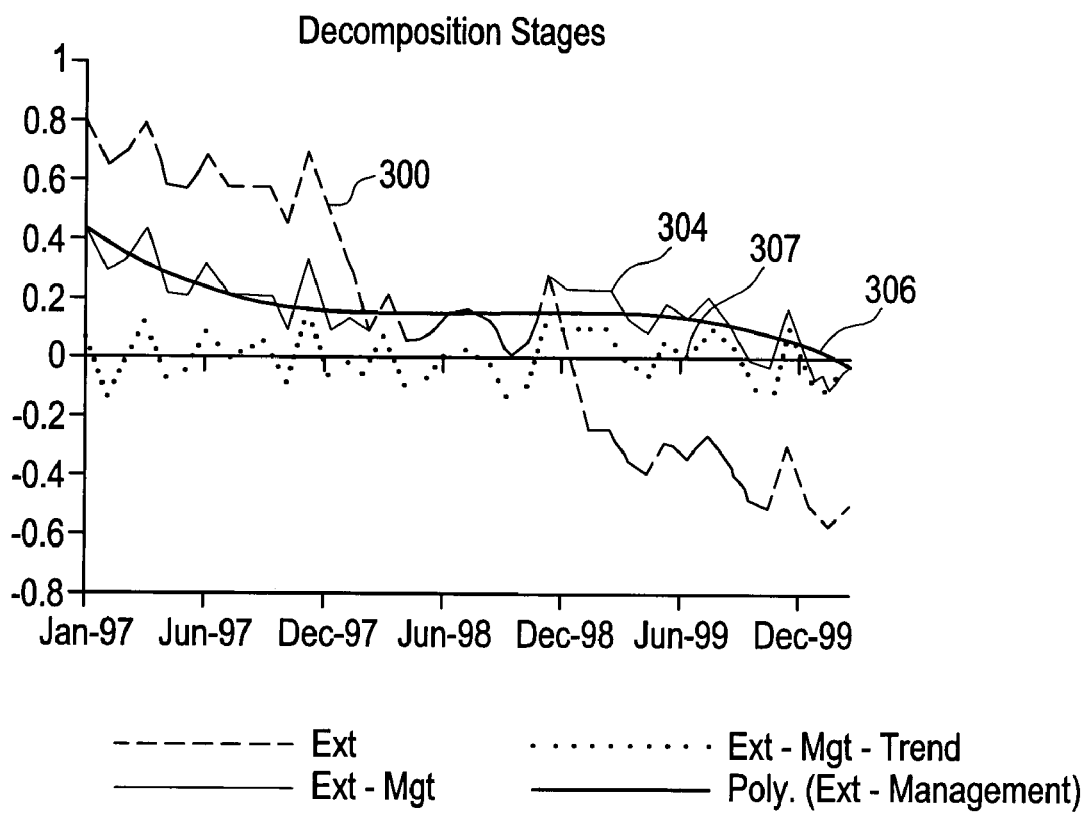

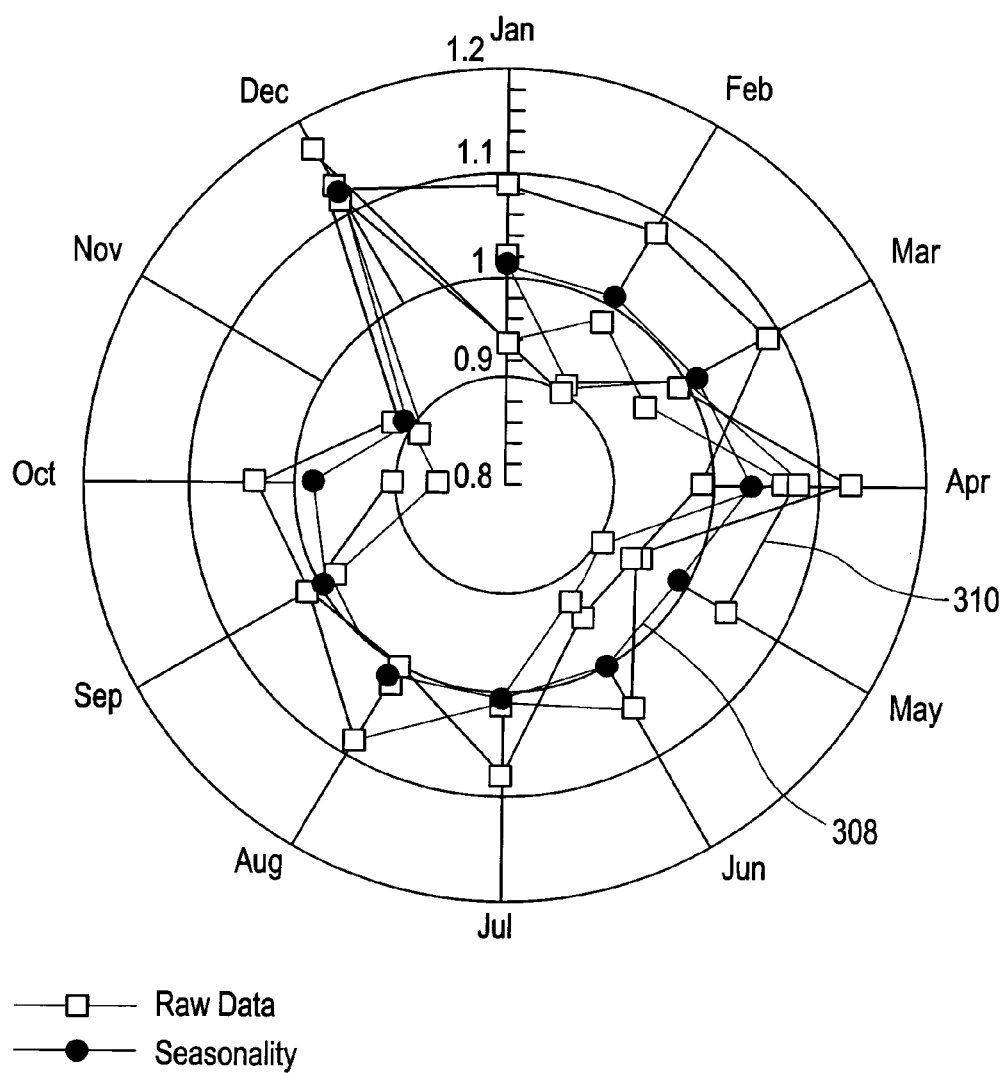

RETAIL LENDING RISK RELATED SCENARIO GENERATION

CROSS-REFERENCE TO RELATED APPLICATIONS

This application is a continuation-in-part of application Ser. No. 09/781,310, filed Feb. 13, 2001, entitled "Vintage Maturation Analytics for Predicting Behavior and Projecting Cash Flow for Customer Communities and Their Responses to Economic, Competitive, or Management Changes" which claims the benefit of U.S. Provisional Application Ser. No. 60/184,190, filed Feb. 22, 2000. This application is also a continuation-in-part of application Ser. No. 10/215,805, filed Aug. 9, 2002, entitled "Method and System for Modeling Account Behavior" which claims the benefit of U.S. Provisional Application Ser. No. 60/310,845, filed Aug. 9, 2001. This application also claims the benefit of U.S. Provisional Application No. 60/355,123, entitled "Dual-time Dynamics for Economic Capital Calculation and Predicting Portfolio Performance" filed Feb. 8, 2002. All of the above are incorporated herein by reference.

BACKGROUND

In lending, loan portfolios are fraught with inherent risk because the future is unknown. The institutions that can best manage this risk, and, in essence, predict the future, are the ones most suited to succeed. As a result, lending institutions, in an attempt to minimize this risk, have devised numerous models and methods to try to approximate the future or, at the very least, research the past as an indicator of the future. The greatest difficulty in developing these methods and models is in choosing an appropriate range of possible futures and correctly assigning probabilities of occurrence to them. The problem is that the future of a loan portfolio, like many other problems, is path dependent. Given a set of possible events, it may be impossible for them all to occur because of mutual exclusivity. We cannot have a robust economy driving a booming portfolio next month if we are in the depths of a recession this month.

The amount of available data also creates limitations that must be dealt with. The standard caveat in stock trading is that past returns many not reflect future performance. The same is true when considering the time series of a loan portfolio's performance. The Asian Economic Crisis is a prime example, where 10 years of smooth steady performance did not represent the range of possible futures because the portfolios themselves had shifted to a much higher risk posture during that time. The risk distribution represented by past performance was excluded by current conditions.

Commercial lenders have developed tools over the years that help limit this lending risk. Typically, risk ratings are assigned to commercial borrowers by risk rating agencies, and these risk ratings have worked relatively well in assisting lenders in assessing commercial lending risks. These risk ratings are based on the assumptions that commercial loans are large loans and very few in number and that broad market and balance sheet intelligence exist on the borrower. Retail (consumer) lenders have not enjoyed such equivalent success in risk management.

In current standard practices, retail lenders generate loss forecasts for consumer loans by estimating the next year's expected loss and the deviation about the loss forecast. The loss forecast is usually called the expected loss (EL) and the deviation in losses is called the unexpected loss (UL). Expected losses may be set via internal forecasting processes or simply taken as equal to the previous year. Unexpected losses are usually computed directly from observed historical performance.

For both EL and UL, retail lending institutions know that past performance is not an ideal indicator of future performance because of changes in the portfolio: different demographic mix; different subproduct mix; changes in originations; and credit policy changes. In addition, the economic and competitive environment can change dramatically. Given the few years of data available to the typical institution, the observed historical performance will not capture the breadth of possible economic environments.

Although retail lenders recognize these shortcomings, they still use approaches that do not really address them. The two main approaches that retail lenders use are: (1) Monte Carlo simulation of portfolio performance and (2) industry comparisons. Monte Carlo simulation is a method of trying many possible randomly generated futures. In general, Monte Carlo is a well-known and useful technology, but when applied to total portfolio performance, it is unable to account for any of the portfolio and environmental changes mentioned above. Industry comparison is a logical approach to bolstering the limited internal data by looking at performance of other retail lending institutions. Unfortunately, industry comparison is crude at best because there is no clear approach to calibrating industry-wide data to an individual retail lending institution's portfolio. The industry average can be changing in composition as well as the individual portfolio.

In light of these shortcomings, many organizations have tried to use the tools developed for commercial lending. Those tools, however, are not suitable for application to retail lending because the underlying factors that make them work for commercial lending (i.e., small numbers of large loans, broad market and balance sheet intelligence on the borrower) do not carryover to retail lending. As a result, the leading retail lending institutions do not consider these tools very useful.

Another frequently tried and failed approach is to aggregate account-level scores to the total portfolio. The difficulty is that almost all scores created are rank orderings of customers, not predictions of specific levels of revenue and loss. When the mapping is attempted between scores and loss levels, difficulties arise with the changing environment. Account-level modeling can work for creating loss distributions, but it must begin with a technology, like dual-time dynamics (described below), capable of incorporating consumer lifecycles and the changing external environment.

The standard approaches have such low fidelity that securitization of credit card receivables does not use the typical ABS (Asset-backed Securities) structure of creating different risk tranches. Rather, a single risk pool is created. Accurate forecasting of the distribution of possible losses would make an ABS structure possible. Furthermore, the proposed Basel II Accord for setting economic capital and changes by US regulators highlights the need for new approaches to computing loan loss reserves and economic capital.

SUMMARY

According to one aspect of the present invention, a method for modeling a retail lending portfolio includes providing vintage performance data for a retail lending portfolio in which the portfolio has a key portfolio driver. It further includes selecting a functional form that relates maturation aspects and exogenous aspects of the provided data; decomposing the provided data using the selected functional form to generate a portfolio maturation component, a portfolio exogenous component and a vintage calibration parameter. The portfolio exogenous component includes a known exogenous driver. The method further includes extracting the known exogenous driver from the portfolio exogenous component to generate a residual exogenous component; computing monthly changes in the residual exogenous component; measuring the distribution of monthly changes in the residual exogenous component; generating a number of random potential future scenarios for the residual exogenous component using the measured distribution of monthly changes; generating a number of potential future scenarios for the exogenous component using the number of generated potential future scenarios for the residual exogenous component; and generating a number of forecasts for the key portfolio driver using the number of exogenous scenarios.

According to another aspect of the invention, the known exogenous driver may be a management action element, a seasonality element or an underlying trend. The -underlying trend may be competitive pressure or macroeconomic, among other things. The method may further include measuring autocorrelation in the residual exogenous component and using the measured autocorrelation in the generation of the number of random potential future scenarios for the residual component. The number of random potential future scenarios for the residual exogenous component may be generated using a Monte Carlo approach. The method may further include applying a business simulation layer to the generated plurality of forecasts for the key portfolio driver to produce a number of potential future forecasts for a portfolio performance measure. The portfolio portfolio performance measure may be, among others, potential revenues, potential losses, potential profits, value at risk, earnings at risk, economic capital, return on capital, return on equity, a risk adjusted performance measurement. The selected functional form for the method may be additive. The selected functional form may also be multiplicative.

According to another aspect of the present invention, a system for modeling a retail lending portfolio includes a data storage device having vintage performance data for a retail lending portfolio stored thereon. The portfolio has a key portfolio driver. The system also includes a computing device having a modeling engine stored thereon, wherein the modeling engine has a selected functional form programmed therein that relates maturation aspects and exogenous aspects of data. When the modeling engine is executed, the vintage performance data is retrieved from the data storage device and the data is processed to decompose the data to generate a portfolio maturation component, a portfolio exogenous component and a vintage calibration parameter; wherein the portfolio exogenous component includes a known exogenous driver. The executed modeling engine further extracts the known exogenous driver from the portfolio exogenous component to generate a residual exogenous component; computes monthly changes in the residual exogenous component; measures the distribution of monthly changes in the residual exogenous component; generates a number of random potential future scenarios for the residual exogenous component using the measured distribution of monthly changes; generates a number of potential future scenarios for the exogenous component using the number of generated potential future scenarios for the residual exogenous component; and generates a number of forecasts for the key portfolio driver using the number of exogenous scenarios.

According to yet another aspect of the invention, a computer-readable medium encoded with a set of instructions for modeling a retail lending portfolio, wherein the portfolio has a key portfolio driver and wherein the instructions have a selected functional form programmed therein that relates maturation aspects and exogenous aspects of provided vintage performance data. When the instructions are executed, the instructions perform a method which includes retrieving vintage performance data for a retail lending portfolio; decomposing the provided data using the selected functional form to generate a portfolio maturation component, a portfolio exogenous component and a vintage calibration parameter, wherein the portfolio exogenous component includes a known exogenous driver; extracting the known exogenous driver from the portfolio exogenous component to generate a residual exogenous component; computing monthly changes in the residual exogenous component; measuring the distribution of monthly changes in the residual exogenous component; generating a number of random potential future scenarios for the residual exogenous component using the measured distribution of monthly changes; generating a number of potential future scenarios for the exogenous component using the number of generated potential future scenarios for the residual exogenous component; and generating a number of forecasts for the key portfolio driver using the number of exogenous scenarios.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 3A depicts a visualization of how the modeling approach of the present invention decomposes historical data into age-based (maturation) and time-based (exogenous) effects;

FIG. 3B is an exemplary visualization of a decomposed age-based (maturation) curve;

FIG. 3C is an exemplary visualization of a decomposed time-based (exogenous) curve;

FIG. 8 is an exemplary exogenous curve with management actions extracted;

FIG. 9 is an exemplary polynomial fit to the exogenous curve without management effects;

FIG. 10 is an exemplary detrended exogenous curve produced by removing the polynomial trend and management effects;

FIG. 11 is an exemplary polar plot of the detrended curve highlighting seasonal effects with the "seasonality" curve showing a smoothed curve generated with consideration of the uncertainty present in this small of a data set;

DETAILED DESCRIPTION OF THE INVENTION

Figure 1:
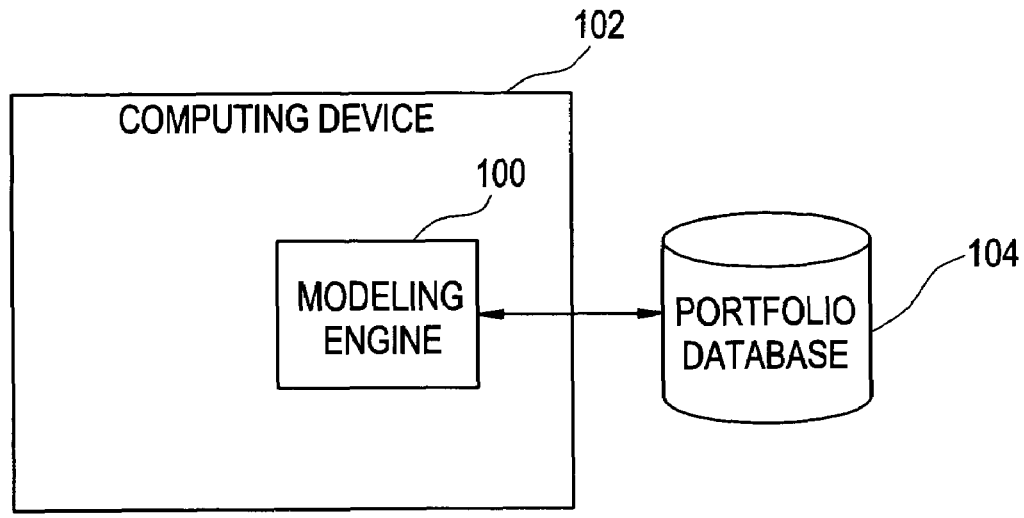
FIG. 1 illustrates an exemplary operating environment of the present invention.

Referring to FIGS. 1, 2 and 3A-C, the modeling approach of the present invention for decomposing historical data into age-based and time-based components, generally called dual-time dynamics is depicted. The modeling approach of the present invention may be implemented in any form most practical for the user. Referring to FIG. 1, in a preferred embodiment, the modeling approach is implemented as a modeling engine 100 resident on a computing device 102 that interacts with a portfolio database 104 which may be external to the computing device 102 as depicted or may be resident within the computing device 102. The modeling approach of the present invention may be implemented in other forms as well, such as a set of stored instructions on a computer-readable medium. Dual-time dynamics is more fully described in co-pending application Ser. No. 09/781,310, filed Feb. 13, 2001, entitled "Vintage Maturation Analytics for Predicting Behavior and Projecting Cash Flow for Customer Communities and Their Responses to Economic, Competitive, or Management Changes" which claims priority from U.S. provisional patent application Ser. No. 60/184,190, both of which are incorporated herein by reference.

Dual-time dynamics decomposes historical data into tenure-based and time-based components. Dual-time dynamics derives and interprets the natural, usually non-linear, maturation process for segments of customer accounts. By knowing what should happen under normal conditions, dual-time dynamics is able to quantify the unexpected components of performance and relate them to economic, management, competitive, or other exogenous factors. This decomposition is a critical first step to understanding the underlying drivers of consumer behavior.

The dual-time dynamics system begins with actual historical data for an institution. From this data, dual-time dynamics learns the nonlinear functions governing the way the customer relationship matures with time. Simultaneously, dual-time dynamics quantifies the impact of exogenous variables on these accounts. Knowing the nonlinear functions governing account maturation allows dual-time dynamics to immediately make long-term baseline projections of segment and portfolio risk, revenue, and value.

On a parallel path, the external impacts are analyzed to quantify the impact of various management policies, the competitive environment, or economic drivers on consumer behavior. Dual-time dynamics technology is uniquely capable of quantifying exogenous factors in the presence of changing portfolio demographics, policies, and competitors.

Figure 2:
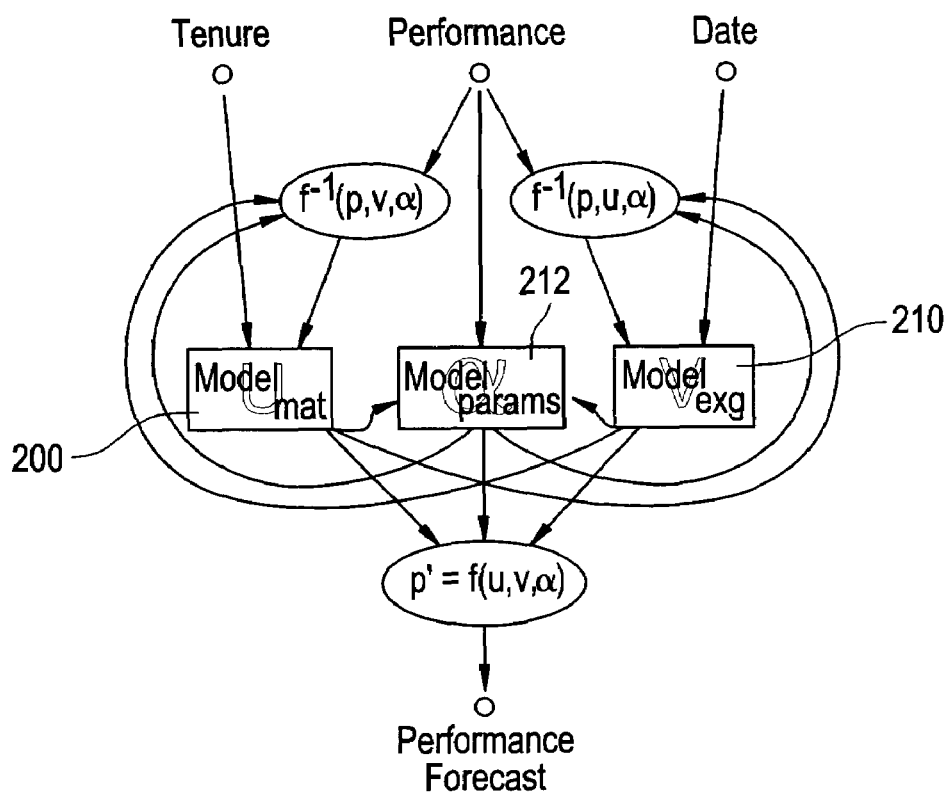
FIG. 2 is a visualization of how dual-time dynamics decomposes historical data into age-based (maturation) and time-based (exogenous) effects.

FIG. 2 illustrates the dual-time dynamics approach. Rather than model the historical data with a single model, the dual-time dynamics engine creates two distinct models. Dual-time dynamics decomposes the historical performance of key portfolio drivers into their constituent parts: maturation curves, exogenous curves, and vintage sensitivities. The maturation curve describes the intrinsic consumer behavior over the lifetime of a loan. The exogenous curve includes the impact of exogenous drivers, such as management actions, seasonality, underlying trends which may include competitive pressures and the macroeconomic environment, upon the portfolio. Some of these exogenous drivers may be known. The vintage sensitivities measure the quality of new originations.

Table 1 shows the minimum set of variables needed to capture all the structure in portfolio losses for installment and line-of-credit loans. To predict revenue, the prepayment rate needs to be added to the installment modeling and the revolving balance rate and possibly some fee generation rates need to be added to the line-of-credit modeling. For profitability, costs, such as call center activity, need to be added to both loan types. Table 1 depicts exemplary key portfolio drivers for loss forecasting for installment and line-of-credit retail loans.

TABLE 1

| Installment | Line-of-Credit |
| --- | --- |
| Account Charge-off Rate | Gross Active Rate |
| Balance per Charge-off Account | Credit Line Utilization Rate |
| Recovery Rate as Fraction of Charge-off Balance | Account Charge-off Rate |
|  | Balance per Charge-off Account |
|  | Recovery Rate as Fraction of Charge-off Balance |

Referring again to FIG. 2, the maturation model (U) 200 extracts the tenure-based component of performance while filtering tenure dependence from the input to the exogenous model. Likewise, the exogenous model (V) 210 extracts the date-based component of performance while filtering date dependence from the input to the maturation model. Models U and V may be tabulated functions, neural networks, or other non-linear modeling techniques. Specific vintages are modeled with U, V, and a set of sensitivity parameters, $\alpha$, 212. The modeling and filtering process for U and V and vintage sensitivities $\alpha$ iterates until all three models have converged. After convergence is attained, models similar to those depicted in FIGS. 3A-C may be generated. U becomes a model of the natural consumer dynamics as depicted in FIG. 3B and V captures the environment in which the consumer resides as depicted in FIG. 3C. After convergence is attained, in an embodiment of the present invention, a second-stage decomposition of the exogenous curve may extract exogenous drivers, such as management actions, seasonality and underlying trends, to determine a residual variability. The extracted exogenous drivers are typically known.

Management actions typically appear in an exogenous curve as spikes or sudden level shifts. To extract these spikes from the data, either (1) management must tag specific spikes as having been generated by management, or (2) data from other retail lending institutions are run through dual-time dynamics and their exogenous curves are compared to identify the spikes which are unique to the individual institution.

Seasonal effects are those things that happen in the same month each year. Christmas is the classic example, particularly because it impacts consumer spending so dramatically. Strong underlying trends can create biases when trying to quantify the seasonality. A linear trend can be removed by adjusting the monthly seasonal adjustments to sum to zero. Nonlinear trends must be fit directly and subtracted from the data prior to measuring the seasonality.

After the detrended exogenous curve has been created, the seasonality is measured. Quantifying seasonality is simply a matter of computing the average of all values available for a given calendar month. Often times only short data sets are available. In these instances, it is important to compute error bars as well. The final seasonality to be used can be smoothed relative to the error bars if changes month-to-month are assumed to be small.

Dual-time dynamics are used in the present invention to decompose key portfolio drivers into their underlying causes. In an embodiment of the invention, methods, such as Monte Carlo, may be used with the decomposed portfolio drivers to automatically generate many possible future environments (exogenous curves). With those environmental scenarios generated, in an embodiment of the present invention, the future performance of each key driver for each scenario is forecasted. The key drivers may be combined to create revenue and loss forecasts for each scenario. From the range of possible future losses or revenue, a range of portfolio performance metrics including economic capital may be computed.

Figure 4:
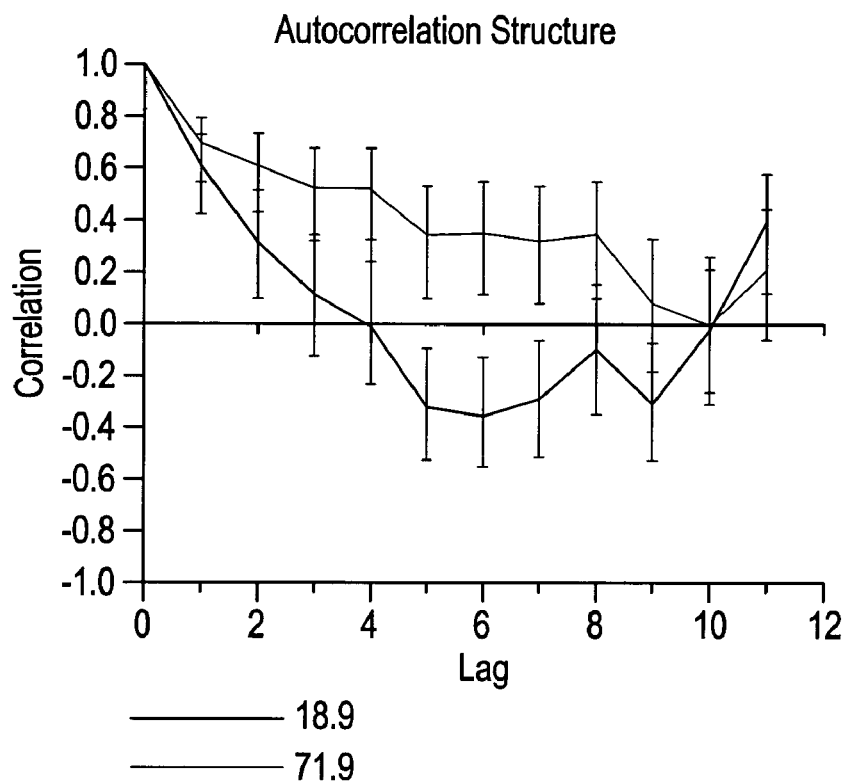
FIG. 4 shows examples of autocorrelation curves measured on actual consumer credit loss data with the legends indicating the risk scaling factors for these curves.

After the dual-time components are calculated, the autocorrelation between revenues and losses being evaluated may be computed. Revenue and losses in consumer loan portfolios are strongly autocorrelated. This is not surprising upon reflection given that only 1% to 5% of the accounts change each month. FIG. 4 shows the autocorrelation structure determined by an embodiment of the present invention for consumer loan portfolios.

Much of the portfolio-level autocorrelation comes from maturation effects. As such, it is automatically accounted for in the decomposition process. The remaining autocorrelation structure derives from trends in the environment. The economy does not swing wildly from boom to bust on random months. Rather, it is a gradual process. Through the 90s, economic expansion lasted for eight years. The typical recession lasts twelve months. These effects appear as trends in the exogenous curve.

At this point in the process, the trend lengths typical in historical data are preserved. Later in the process, when random scenarios are generated, many possible trends are allowed for. To preserve the trend length of the historical data, the autocorrelation in the exogenous curve, $p_T$, is measured after removing seasonality and management actions, but with the trend left in. To make the autocorrelation estimate accurate, it is helpful to have either many years of historical data or data from multiple regions for comparison.

Create Distribution of Exogenous Changes By measuring the monthly changes in the exogenous curve without seasonality and management changes, distribution of unexpected external changes, D, may be created. Experimental observation has shown that these distributions have broader tails than a Normal distribution.

In computing these monthly changes, the trend should be retained. As long as the trend is not understood, it should not be assumed that the future will have no trend or a different trend. This distribution becomes much more robust as multiple economic cycles are observed.

Generate New Exogenous Curves In this embodiment, with the distribution of monthly changes and autocorrelation structure known, many realizations of possible futures that are consistent with past behavior may be randomly generated. This is the essence of Monte Carlo simulation, although other techniques may be substituted.

To generate a random sequence of changes consistent with the observed autocorrelation and distribution, one possible approach is to create a linear model of the form below:

$$x(t) = p_0 r + \sum_{i=1}^{n} p_i x(t-i) \quad \text{(EQ 1)}$$

where r is randomly generated from the observed distribution of changes, x(t) are the randomly generated monthly changes, and $p_i, i=[1,n]$ is the set of parameters to be optimized so as to recreate the autocorrelation structure relative to the previous n months. In one embodiment, simple gradient descent optimization is used to solve this problem, but other approaches may be applied as well. When optimizing the parameters, failure to use the true distribution of changes can result in incorrect results because actual behavior can have a non-Normal distribution.

When finding the optimal parameters, the error in accurately reproducing the autocorrelation function and the error in regenerating the observed distribution are included. In this embodiment, accuracy of the output distribution, D, must be included because Equation 1 can alter the distribution under poor choices of parameters. A Kolmogorov-Smirnov (KS) measure is a common but not unique metric for quantifying the discrepancy between two distributions.

This is a multivariate optimization problem where it is desired to simultaneously reduce the errors in the autocorrelation and distribution. A sufficient approach may be to heuristically choose a set of weights, $w_i$, to combine these to a single fitness criteria, $\epsilon$.

$$\varepsilon = w_0 \cdot KS(D, \tilde{D}) + \sum_{i=1}^{n} w_i \cdot L(\rho_T - \tilde{\rho}_T) \quad \text{(EQ 2)}$$

In Equation 2, L is an L-norm; a distance metric. The $L^2$-norm is a usual choice in problems with moderate noise levels.

To each of the series x(t), the seasonality and any expected management actions are added to create a scenario for the exogenous curve.

Forecast Portfolio Performance With many realizations of possible future exogenous curves generated, numerous forecasts of the total portfolio behavior may be created. Each simulated exogenous curve is combined with the maturation process of the vintages, the planned new bookings, and any planned policy changes. The result is a set of forecasts of the key rates driving portfolio performance, which is then run through a business simulation layer to produce forecast distributions of possible future revenues, losses, and profits. This distribution accounts for the expected maturation behavior of the portfolio while overlaying many realizations of unknown external impacts. Such a distribution appears to be ideally suited for use by risk management and capital allocation systems.

In addition to the Monte Carlo approach of creating many random futures, specifically chosen scenarios may be generated to consider possibilities that may not be fully covered otherwise. In order to combine these scenarios with the randomly generated distribution, the user needs to estimate the likelihood of occurrence.

Compute Performance Metrics Dual-time dynamics provides the unique ability to enhance portfolio metrics with predictions of a distribution of possible outcomes. By utilizing the Monte Carlo simulation of the exogenous curve described above, the distribution of possible future outcomes incorporates the maturation process for accounts, seasonality, and a range of exogenous effects. It is a distribution of where the current portfolio might go rather than where it has been. Being able to create forward-looking distributions of portfolio performance opens the door to a range of possible statistical measures of future performance.

Value at Risk Conceptually, Value at Risk is intended to be a forward-looking statistic. If one can accurately estimate the current value, the sensitivity to change, and the probability of change, the potential loss in value can be estimated. Any model for these quantities must be based in large part on historical experience. Most such approaches currently use simplified models or even intuitive estimates.

$$VaR = \begin{bmatrix} \text{current value} \\ \text{of portfolio} \end{bmatrix} \begin{bmatrix} \text{sensitivity of portfolio to} \\ \text{change in underlying factors} \end{bmatrix} \begin{bmatrix} \text{potential change} \\ \text{in underlying factors} \end{bmatrix}$$ (EQ 3)

Value at Risk is widely used in commercial lending where ratings are available for each loan recipient and ratings change models are wide spread. Such bottom-up approaches are rarely applied in consumer lending where account level models typically lack the necessary level of detail as explained in the introduction.

Conceptually, Value at Risk is meant to capture the potential for loss of value in the portfolio. With the dual-time dynamics approach, all portfolios are expected to change value at least in part due to the expected maturation process, not just from unexpected events. The concept of Value at Risk can be improved by improving either the definition of current value or by broadening the range of risks to include expected threats such as maturation.

Using the approach of the present invention described above, many possible portfolio sensitivities in a distribution of possible outcomes may be incorporated. Each of these time series can be used to measure the current value of the portfolio using a Net Present Value calculation.

$$NPV = \text{Current Value} + \sum_{i=1}^{n} \frac{\text{Profit}_i}{1 + \text{risk free rate}}$$ (EQ 4)

By creating a distribution of NPV calculated from many simulated futures, the probability of any given NPV amount can be determined. Value at Risk can then be defined as $$VaR = k\sigma_{NPV} \cdot \text{Avg NPV}$$ (EQ 5)

where Average NPV is the mean of the distribution of possible NPVs and $\sigma_{NPV}$ is the standard deviation of NPVs. k is the risk tolerance of the corporation.

Earnings at Risk Earnings at Risk measures the distribution of past earnings and quantifies how much earnings could fall in a poorly performing period. Expected performance might be best expressed as the average of past performance, but Earnings at Risk measures the potential drop in earnings at a benchmark level of uncertainty.

$$EaR = k\sigma$$ (EQ 6)

$\sigma$ is the standard deviation of profits for the business line, and k is the risk tolerance of the corporation.

Earnings are usually measured as revenue net of credit losses, operating expenses, and cost of funds.

Given the redesign of Value at Risk just described, Earnings at Risk can follow exactly the same approach where earnings projections are based upon the dual-time dynamics Monte Carlo simulation of future earnings rather just measures of the historical distribution.

Figure 5:
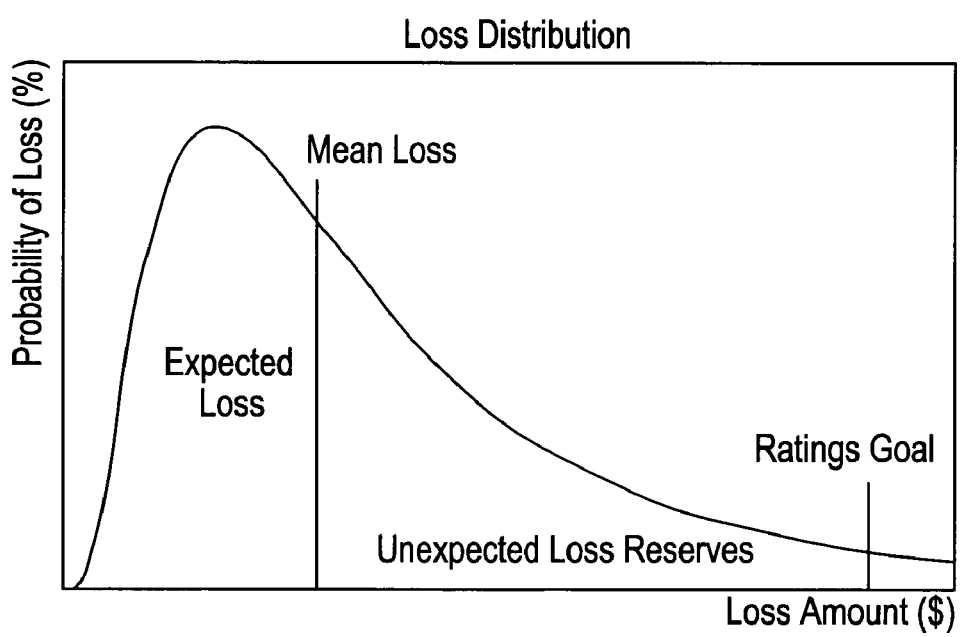
FIG. 5 illustrates an exemplary distribution of possible future losses as a function of amount. In this example, the mean of the distribution determines expected losses, and unexpected losses are set by a separate bond ratings goal.

Economic (or Risk) Capital A financial institution's response to uncertainty is to set aside capital to be used in case of fiscal emergency. Given an estimation of the distribution of possible future losses generated by an embodiment of the present invention, the mean of the distribution defines the expected loss, as depicted in FIG. 5. The financial institution's products should obviously be designed such that expected losses are covered by expected revenues. The institution must then decide upon a level of capital reserves to set aside to protect against unexpected losses. To choose this level, a solvency goal, or more directly a bond ratings goal, should be chosen. That choice in turn determines the capital reserve level required.

$$\text{Solvency} = \int_0^{(EL+UL)} LPD(x)dx$$ (EQ 7)

where EL is the expected loss reserve level, UL is the unexpected loss reserve level, and LPD(x) is the probability distribution of future losses.

A choice of 99.9% solvency, for example, would require setting unexpected loss reserves such that when added to expected loss reserves, 99.9% of the distribution of possible outcomes is covered.

The current Basel II proposal sets economic capital to EL+UL, although UL alone is being proposed by many institutions.

Return on Capital Return on Capital is the ratio of profit generated on a pool of loans to the capital reserves required to support those loans. The current standard for regulatory capital is 8% of assets, although this will change under the Basel II Accord such that the estimate of economic capital above will become a more appropriate measure. Thus, in one embodiment of the present invention, the basic Return on Capital formula is not altered, but the forward looking estimates of expected return and capital requirements are replaced as described above.

$$RoC = \frac{\text{return}}{\text{capital}}$$ (EQ 8)

The financial industry also tends to distinguish between gross Return on Capital and net Return on Capital. Net Return on Capital is the marginal return generated above that which could have been obtained through a risk free investment (US government bonds).

$$\text{net RoC} + \text{risk free rate} = \text{gross RoC}$$ (EQ 9)

Return on Equity Capital is greater than or equal to equity, depending upon subordinated debt. Subordinated debt is counted as capital but not equity. In an embodiment of the present invention, the formula for Return on Equity will not change, but the measure of capital is set as described above in the paragraph entitled "Economic (or Risk) Capital".

$$RoE = RoC \cdot \frac{Capital}{Equity} \quad (EQ\ 10)$$

Risk Adjusted Performance Measurement Any Risk Adjusted Performance Measurement (RAPM) can be modified so that expected revenue, costs, or credit losses are based upon the simulation of possible future portfolio performance as described above. Dependence upon Value at Risk or Earnings at Risk may also be replaced with the version of these statistics generated by the embodiments of the present invention described above.

RoRAA, RARoA, RoRAC(I), RoRAC(II), RoRAC(III), and RARoC are all variations on the general RAPM framework. As such, they can all be extended similarly using the simulation techniques described above to provide forward-looking expectations.

$$RAPM = \frac{revenue - costs - expected\ credit\ losses}{VaR} \quad (EQ\ 11)$$

Return on Risk Adjusted Assets (RORAA)

$$RoRAA = \frac{return - (regulatory\ capital \cdot interest\ rate\ to\ borrow)}{assets} \quad (EQ\ 12)$$

Risk Adjusted Return on Assets (RAROA)

$$RARoA = \frac{expected\ return - expected\ credit\ losses}{assets} \quad (EQ\ 13)$$

Return on Risk Adjusted Capital (RORAC)

$$RoRAC(I) = \frac{return}{total\ equity \cdot \frac{EaR\ of\ business\ line}{EaR\ of\ corporation}} \quad (EQ\ 14)$$

$$RoRAC(II) = \frac{return - (regulatory\ capital \cdot interest\ rate\ to\ borrow)}{total\ equity \cdot \frac{EaR\ of\ business\ line}{EaR\ of\ corporation}} \quad (EQ\ 15)$$

$$RoRAC(III) = \frac{return}{risk\ capital} \quad (EQ\ 16)$$

Risk Adjusted Return on Capital The standard Return on Capital metric where return (R) is the expectation value of the return rather than just the historical average.

The following non-limiting examples illustrate different embodiments of the present invention.

EXAMPLE 1

Modeling Credit Card Performance

Figure 6:
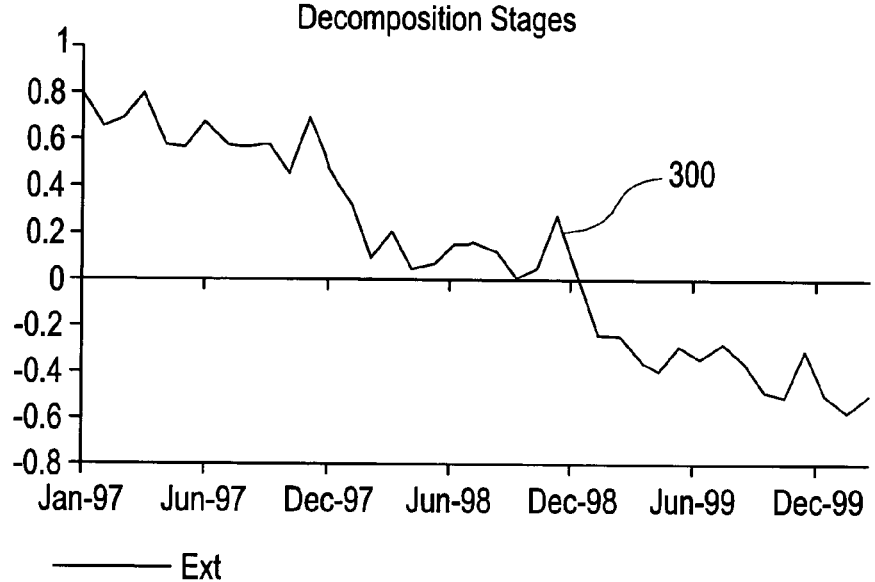
FIG. 6 is an exemplary exogenous curve generated by the dual-time dynamics engine.

An embodiment of the current invention was illustrated by analyzing a specific credit card portfolio. The credit card portfolio data was analyzed with dual-time dynamics to produce a maturation curve, an exogenous curve, and vintage sensitivities. The steps shown below were followed in analyzing the exogenous curve 300 (FIG. 6), creating the needed scenarios, and generating a future loss distribution for the purposes of setting economic capital.

Figure 7:
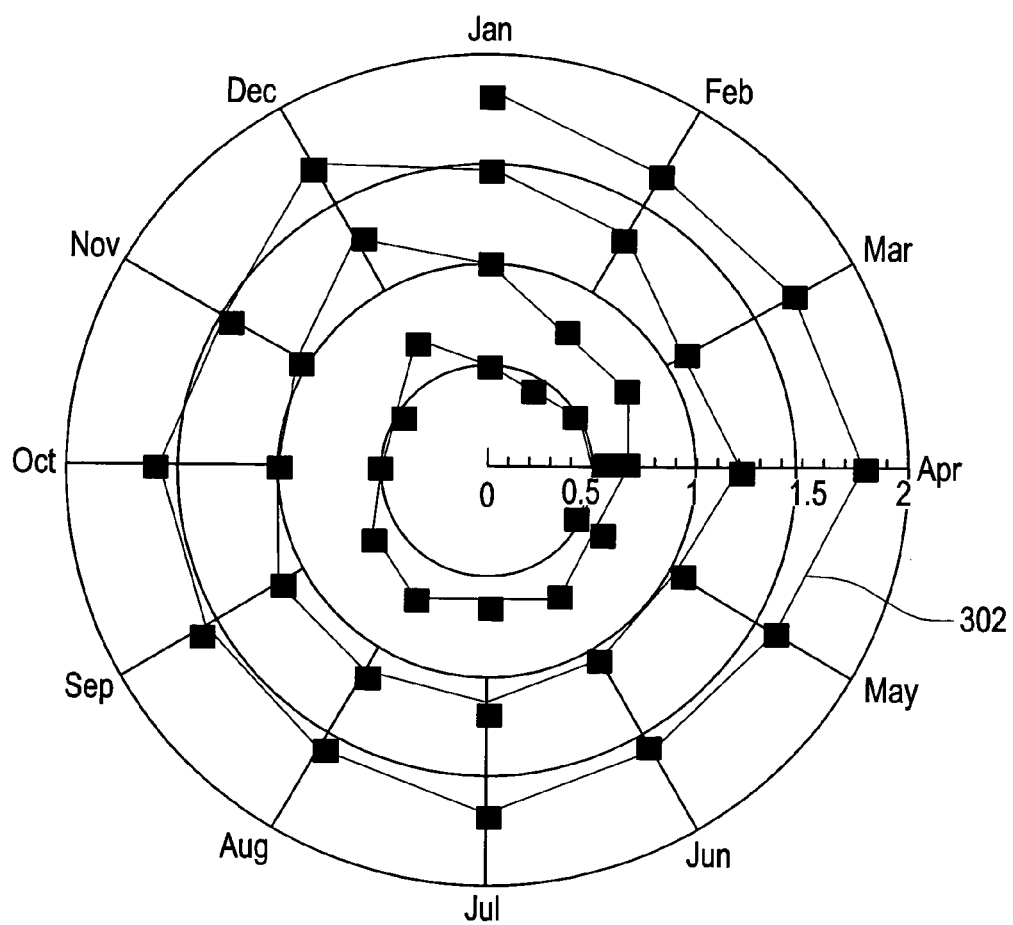
FIG. 7 is an exemplary polar plot of the raw exogenous curve illustrating two sudden level shifts.

Management Impacts The polar plot 302 in FIG. 7 of the exogenous curve 300 reveals two dramatic level shifts. A polar plot by calendar month was used because it reduces confusion from seasonality. From the plot 302, it is shown as precisely as possible when these shifts occurred. The exogenous curve can then be shifted by amounts that minimize the discontinuities at these points, as illustrated by the shifted curve 304 in FIG. 8. In this example, the shifts are 0.36 at February 1998 and 0.47 at January 1999. Those management actions related to credit line increases offered by the card issuer.

Figure 12:
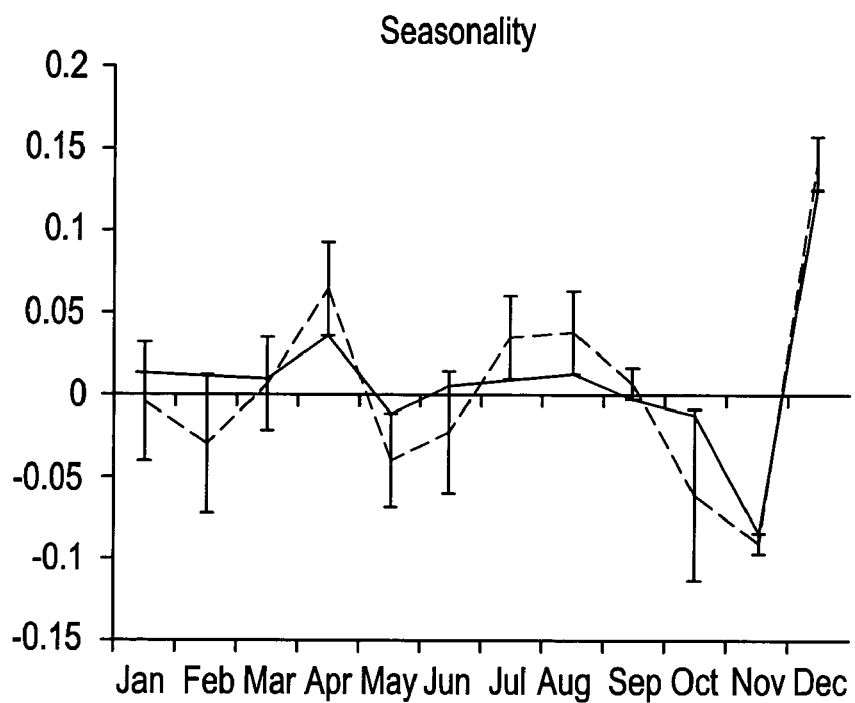
FIG. 12 is an exemplary plot of the average seasonality with error bars and the smoothed curve created via the constrained nearest-neighbor algorithm.

Seasonality Nonlinear trends such as in FIG. 9 must be fit directly and subtracted from the data prior to measuring the seasonality. FIG. 9 shows a polynomial fit 306 to the trend in the exogenous curve and FIG. 10 shows the detrended curve 307. The smoothed curve shown in FIG. 12 is a simple nearest-neighbor smoothing constrained not to drift more than one standard deviation from the original average. FIG. 11 shows the smoothed curve 308 relative to the underlying data 310 in a polar plot.

Figure 13:
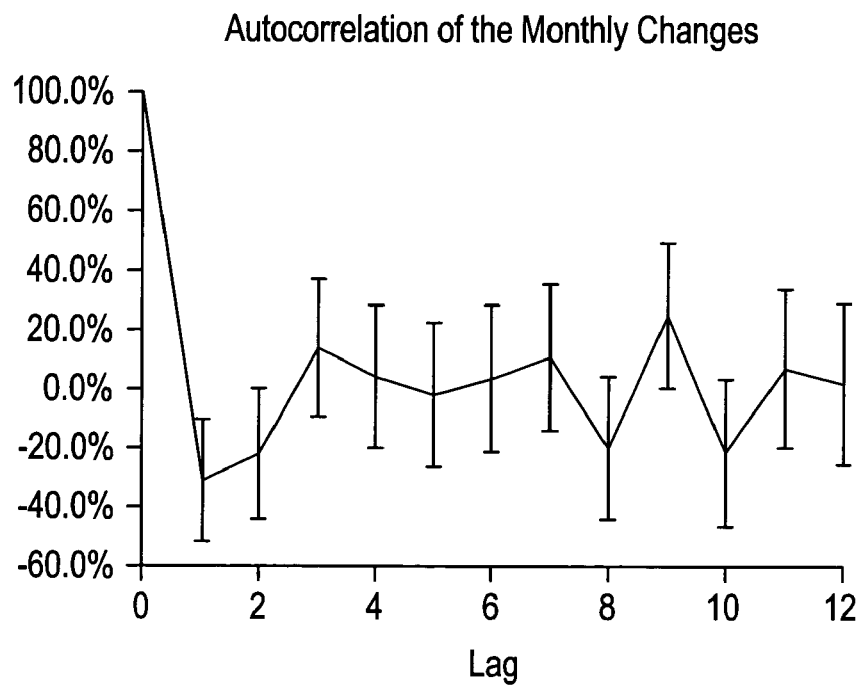
FIG. 13 is an exemplary autocorrelation structure of the monthly changes in the exogenous curve without seasonality or management effects.
Figure 14:
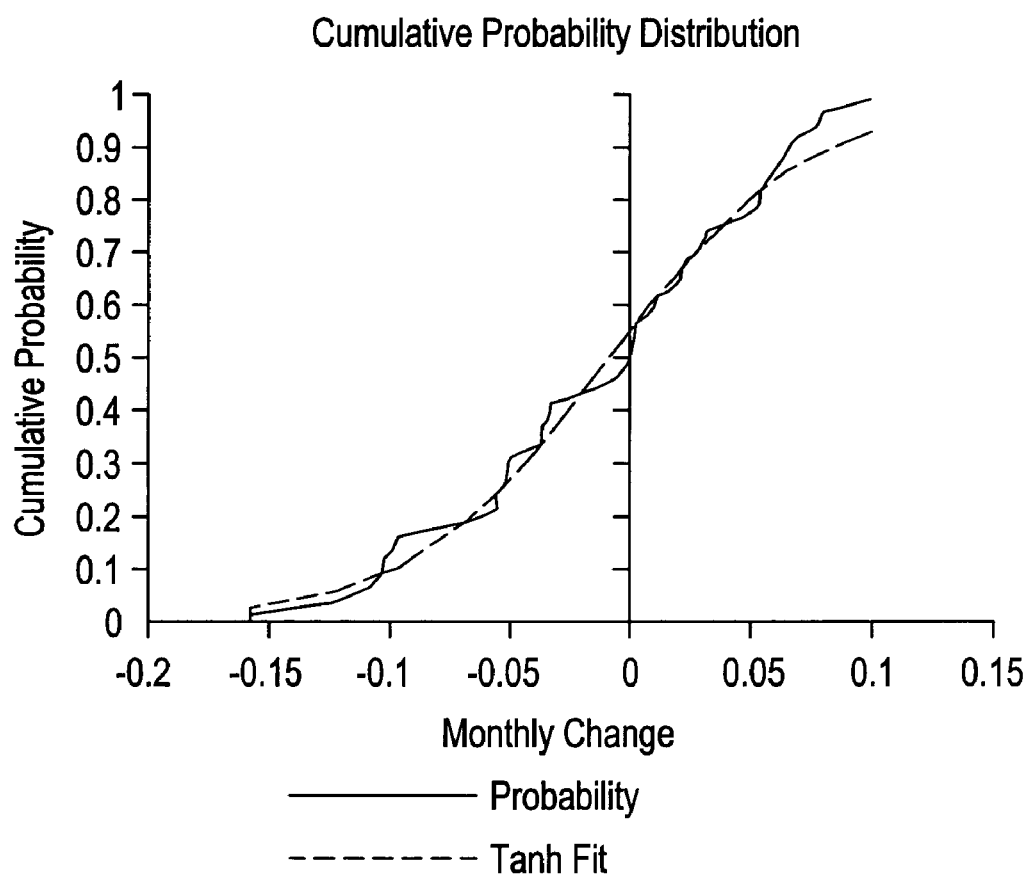
FIG. 14 is an illustration of the cumulative distribution of monthly changes in the exogenous curve without seasonality and management changes.

Monthly Changes In this embodiment, after removing management actions and seasonality, the monthly change in the exogenous curve residuals may be computed. In computing these monthly changes in this example, the trend was retained as shown in FIG. 9. From these monthly changes, the autocorrelation structure was computed as shown in FIG. 13, and the cumulative probability distribution for monthly changes was computed as well as shown in FIG. 14.

Scenario Creation In this example, this embodiment of the invention utilized a random process that matched the autocorrelation and distribution historically observed to randomly generate many possible scenarios of the future of the exogenous curve. Table 2 shows the result of performing a gradient descent optimization to learn the parameters for Equation 1 that would preserve the autocorrelation with the distribution from FIG. 14.

TABLE 2

| $p_0$ | $p_1$ | $p_2$ | $p_3$ | $p_4$ | $p_5$ | $p_6$ | $p_7$ |
|---|---|---|---|---|---|---|---|
| 1.00 | −0.45 | −0.21 | −0.04 | −0.04 | 0.01 | 0.22 | 0.24 |

Figure 15:
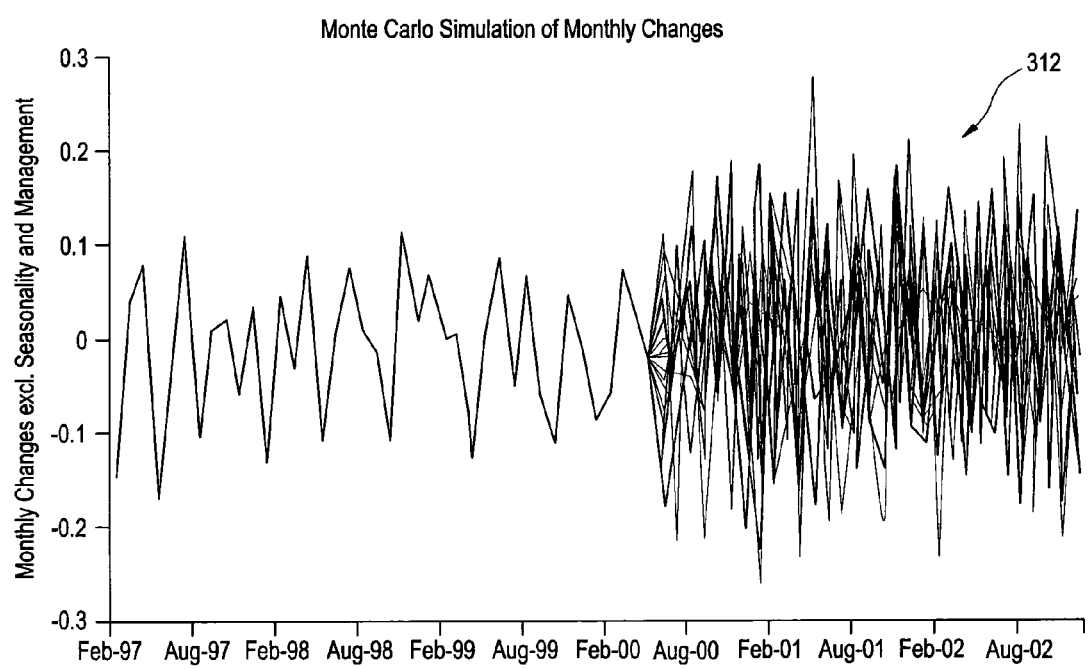
FIG. 15 shows many random extrapolations of monthly changes preserving the historical structures.
Figure 16:
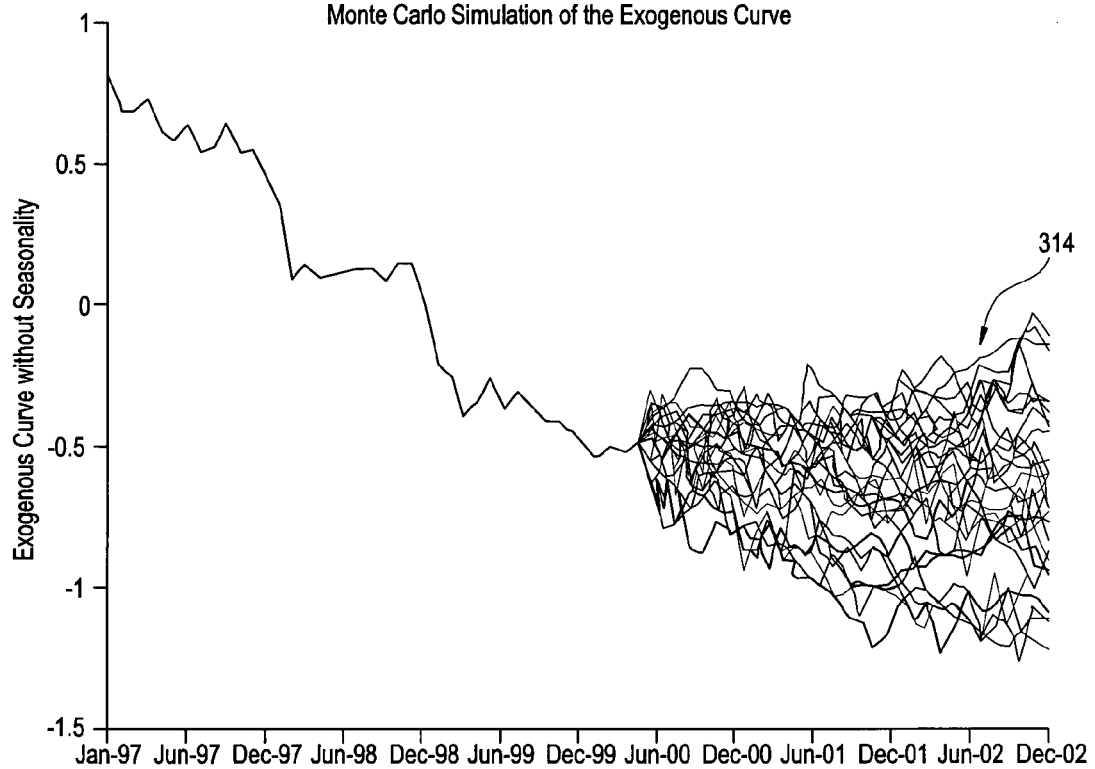
FIG. 16 shows the simulated exogenous curves from the monthly changes in FIG. 15.
Figure 17:
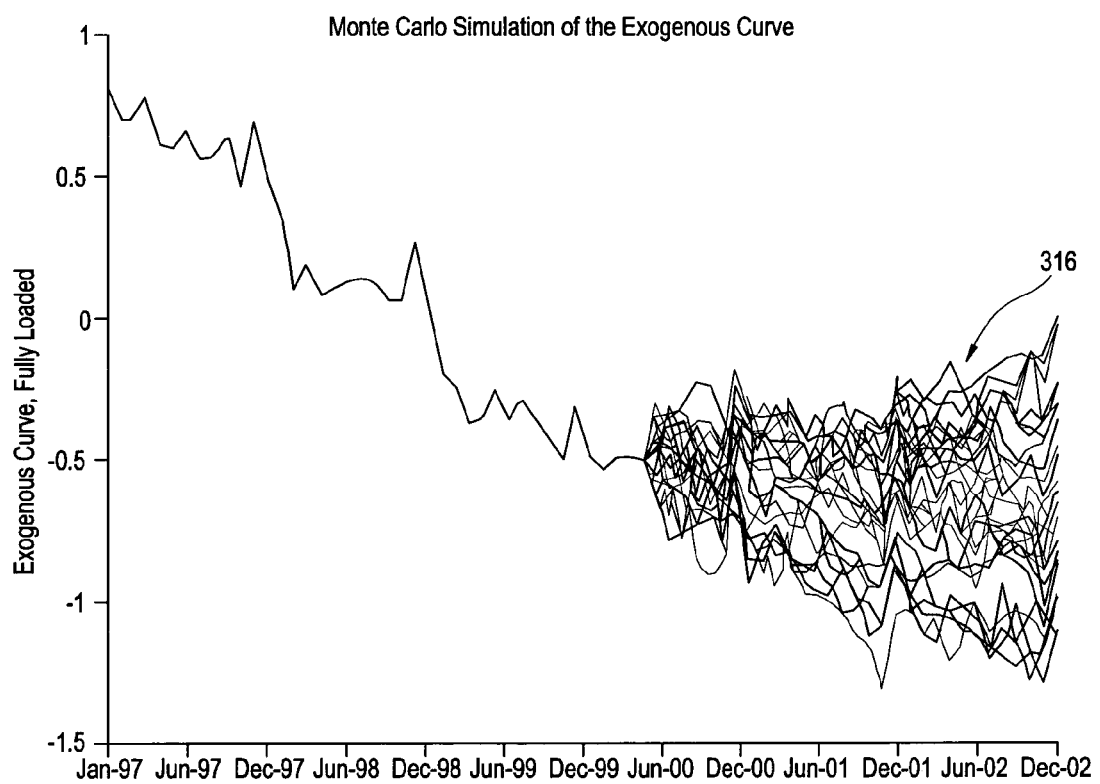
FIG. 17 shows the simulated exogenous curves with the seasonality added.

Using these parameters, many scenarios 312 for the future monthly changes in the residual exogenous curve can be generated, as depicted in FIG. 15. Combining the monthly changes produces the scenarios for the actual exogenous curve, as depicted in FIG. 16. In this embodiment, the last step is then to re-incorporate seasonality into the exogenous curves, as depicted in FIG. 17. These are the final scenarios fed into the forecasts for future losses.

Figure 18:
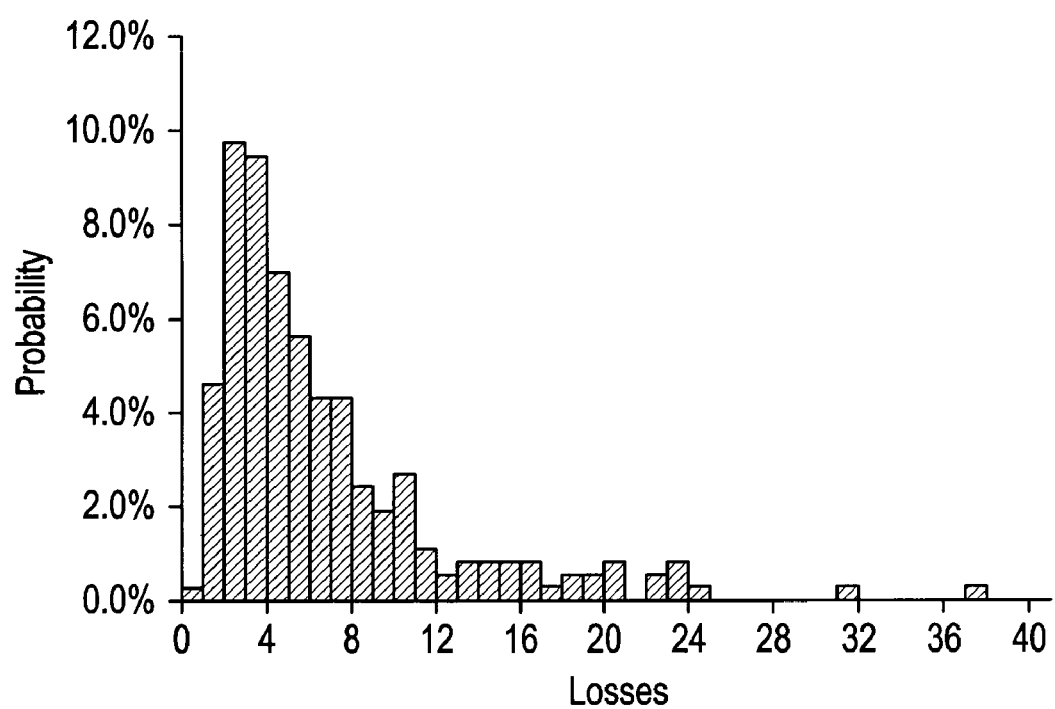
FIG. 18 is the distribution of possible future losses obtained by simulating the portfolio with the randomly generated exogenous curves shown in FIG. 17.

Distribution of Future Losses For each exogenous scenario, the dual-time dynamics forecasting system is run which combines the environmental scenario with the maturation effects and vintage sensitivities to generate loss forecasts. FIG. 18 shows the distribution of potential losses from the scenarios in FIG. 17. The losses represent the total loss over the next 12 months. From this distribution, it can be seen that expected future losses, EL, are $3.7 million. For a solvency of 97.5%, unexpected losses, UL, would be $20.2 million. Therefore, total economic capital would need to be set at $23.9 million dollars under the current Basel II Accord.

Note that this example shows a strong tail for large losses. A traditional approach of estimating the deviation of the distribution and using a Normal distribution approximation would have set UL at $11.5 million, an underestimate of the capital needs of $8.7 million or 36%.

Securitization Most credit card securitizations use a dynamic pool. A dynamic pool replaces accounts performing below a promised level with better performing accounts. This has the effect of keeping the risk on the lending institution's books. Dynamic pools are used because of the inability of institutions to predict future performance.

With the distribution computed above in the section entitled "Distribution of Future Losses", a fixed pool of accounts can be created for securitization purposes. A pool of accounts is securitized such that several different risk categories are created. The purchasers assume the risk of underperformance, but that risk will be priced into the securitization using the distribution of future losses. The approach for doing this is the classic ABS structure. The only piece that has been missing in the past is the creation of a reliable distribution of future losses.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. A method for modeling a retail lending portfolio comprising:
   providing vintage performance data for a retail lending portfolio, wherein the portfolio has at least one key portfolio driver;
   selecting a functional form that provides the relationship between the maturation aspects and exogenous aspects of the provided data;
   decomposing the provided data using the selected functional form to generate a portfolio maturation component, a portfolio exogenous component and at least one vintage calibration parameter, wherein the portfolio exogenous component includes at least one known exogenous driver;
   extracting the at least one known exogenous driver from the portfolio exogenous component to generate a residual exogenous component; computing monthly changes in the residual exogenous component;
   measuring the distribution of monthly changes in the residual exogenous component;
   generating a plurality of random potential future scenarios for the residual exogenous component using the measured distribution of monthly changes;
   generating a plurality of potential future scenarios for the exogenous component using the plurality of generated potential future scenarios for the residual exogenous component; and
   generating a plurality of forecasts for the at least one key portfolio driver using the plurality of exogenous scenarios.

2. The method for modeling a retail lending portfolio of claim 1 wherein the at least one known exogenous driver is a management action element.

3. The method for modeling a retail lending portfolio of claim 1 wherein the at least one known exogenous driver is a seasonality element.

4. The method for modeling a retail lending portfolio of claim 1 wherein the at least one known exogenous driver is an underlying trend.

5. The method for modeling a retail lending portfolio of claim 4 wherein the underlying trend is competitive pressure.

6. The method for modeling a retail lending portfolio of claim 4 wherein the underlying trend is macroeconomic.

7. The method for modeling a retail lending portfolio of claim 1, further comprising: measuring autocorrelation in the residual exogenous component and using the measured autocorrelation in the generation of the plurality of random potential future scenarios for the residual component.

8. The method for modeling a retail lending portfolio of claim 1 wherein the plurality of random potential future scenarios for the residual exogenous component are generated using a Monte Carlo approach.

9. The method for modeling a retail lending portfolio of claim 1, further comprising: applying a business simulation layer to the generated plurality of forecasts for the at least one key portfolio driver to produce a plurality of potential future forecasts for at least one portfolio performance measure.

10. The method for modeling a retail lending portfolio of claim 9, wherein the at least one portfolio performance measure is potential revenues.

11. The method for modeling a retail lending portfolio of claim 9, wherein the at least one portfolio performance measure is potential losses.

12. The method for modeling a retail lending portfolio of claim 9, wherein the at least one portfolio performance measure is potential profits.

13. The method for modeling a retail lending portfolio of claim 9, wherein the at least one portfolio performance measure is value at risk.

14. The method for modeling a retail lending portfolio of claim 9, wherein the at least one portfolio performance measure is earnings at risk.

15. The method for modeling a retail lending portfolio of claim 9, wherein the at least one portfolio performance measure is economic capital.

16. The method for modeling a retail lending portfolio of claim 9, wherein the at least one portfolio performance measure is return on capital.

17. The method for modeling a retail lending portfolio of claim 9, wherein the at least one portfolio performance measure is return on equity.

18. The method for modeling a retail lending portfolio of claim 9, wherein the at least one portfolio performance measure is a risk adjusted performance measurement.

19. The method for modeling a retail lending portfolio of claim 1 wherein the selected functional form is additive.

20. The method for modeling a retail lending portfolio of claim 1 wherein the selected functional form is multiplicative.

21. A system for modeling a retail lending portfolio comprising:
   a data storage device having vintage performance data for a retail lending portfolio stored thereon, wherein the portfolio has at least one key portfolio driver;
   a computing device having a modeling engine stored thereon, wherein the modeling engine has a selected functional form programmed therein that provides the relationship between the maturation aspects and exogenous aspects of data, wherein when the modeling engine is executed: the vintage performance data is retrieved from the data storage device and the data is processed to decompose the data to generate a portfolio maturation component,
   a portfolio exogenous component and at least one vintage calibration parameter;
   wherein the portfolio exogenous component includes at least one known exogenous driver;
   wherein the executed modeling engine further:
   decomposes the provided data using the selected functional form to generate a portfolio maturation component, a portfolio exogenous component and at least one vintage calibration parameter, wherein the portfolio exogenous component includes at least one known exogenous driver;
   extracts the at least one known exogenous driver from the portfolio exogenous component to generate a residual exogenous component;
   computes monthly changes in the residual exogenous component;
   measures the distribution of monthly changes in the residual exogenous component;
   generates a plurality of random potential future scenarios for the residual exogenous component using the measured distribution of monthly changes;
   generates a plurality of potential future scenarios for the exogenous component using the plurality of generated potential future scenarios for the residual exogenous component; and
   generates a plurality of forecasts for the at least one key portfolio driver using the plurality of exogenous scenarios.

22. The system for modeling a retail lending portfolio of claim 21 wherein the at least one known exogenous driver is a management action element.

23. The system for modeling a retail lending portfolio of claim 21 wherein the at least one known exogenous driver is a seasonality element.

24. The system for modeling a retail lending portfolio of claim 21 wherein the at least one known exogenous driver is an underlying trend.

25. The system for modeling a retail lending portfolio of claim 21 wherein the underlying trend is competitive pressure.

26. The system for modeling a retail lending portfolio of claim 21 wherein the underlying trend is macroeconomic.

27. The system for modeling a retail lending portfolio of claim 21 wherein the executed modeling engine further measures autocorrelation in the residual exogenous component and uses the measured autocorrelation in the generation of the plurality of random potential future scenarios for the residual component.

28. The system for modeling a retail lending portfolio of claim 21 wherein the plurality of random potential future scenarios for the residual exogenous component are generated using a Monte Carlo approach.

29. The system for modeling a retail lending portfolio of claim 21 wherein the executed modeling engine further applies a business simulation layer to the plurality of potential future portfolio scenarios to produce a potential future forecast.

30. The system for modeling a retail lending portfolio of claim 29, wherein the at least one portfolio performance measure is potential revenues.

31. The system for modeling a retail lending portfolio of claim 29, wherein the at least one portfolio performance measure is potential losses.

32. The system for modeling a retail lending portfolio of claim 29, wherein the at least one portfolio performance measure is potential profits.

33. The system for modeling a retail lending portfolio of claim 29, wherein the at least one portfolio performance measure is value at risk.

34. The system for modeling a retail lending portfolio of claim 29, wherein the at least one portfolio performance measure as earnings at risk.

35. The system for modeling a retail lending portfolio of claim 29, wherein the at least one portfolio performance measure is economic capital.

36. The system for modeling a retail lending portfolio of claim 29, wherein the at least one portfolio performance measure is return on capital.

37. The system for modeling a retail lending portfolio of claim 29, wherein the at least one portfolio performance measure is return on equity.

38. The system for modeling a retail lending portfolio of claim 29, wherein the at least one portfolio performance measure is a risk adjusted performance measurement.

39. The system for modeling a retail lending portfolio of claim 21 wherein the selected functional form is additive.

40. The system for modeling a retail lending portfolio of claim 21 wherein the selected functional form is multiplicative.

41. A computer-readable medium encoded with a set of instructions for modeling a retail lending portfolio, wherein the portfolio has at least one key portfolio driver and wherein the instructions have a selected functional form programmed therein that provides the relationship between the maturation aspects and exogenous aspects of provided vintage performance data; wherein when the instructions are executed, the instructions perform a method comprising:
   retrieving vintage performance data for a retail lending portfolio, decomposing the provided data using the selected functional form to generate a portfolio maturation component, a portfolio exogenous component and at least one vintage calibration parameter, wherein the portfolio exogenous component includes at least one known exogenous driver; extracting the at least one known exogenous driver from the portfolio exogenous component to generate a residual exogenous component;
   computing monthly changes in the residual exogenous component; measuring the distribution of monthly changes in the residual exogenous component;
   generating a plurality of random potential future scenarios for the residual exogenous component using the measured distribution of monthly changes;
   generating a plurality of potential future scenarios for the exogenous component using the plurality of generated potential future scenarios for the residual exogenous component; and generating a plurality of forecasts for the at least one key portfolio driver using the plurality of exogenous scenarios.

42. The encoded computer-readable medium of claim 41 wherein the at least one known exogenous driver of the portfolio exogenous component is a management action element.

43. The encoded computer-readable medium of claim 41 wherein the at least one known exogenous driver of the portfolio exogenous component is a seasonality element.

44. The encoded computer-readable medium of claim 41 wherein the at least one known exogenous driver of the portfolio exogenous component is an underlying trend.

45. The encoded computer-readable medium of claim 41 wherein the at least one known exogenous driver of the portfolio exogenous component is competitive pressure.

46. The encoded computer-readable medium of claim 41 wherein the at least one known exogenous driver of the portfolio exogenous component is macroeconomic.

47. The encoded computer-readable medium of claim 41, wherein the executed instructions further measure autocorrelation in the residual exogenous component and use the measured autocorrelation in the generation of the plurality of random potential future scenarios for the residual component.

48. The encoded computer-readable medium of claim 41 wherein the plurality of random potential future scenarios for the residual exogenous component are generated using a Monte Carlo approach.

49. The encoded computer-readable medium of claim 41 wherein the executed instructions further apply a business simulation layer to the generated plurality of forecasts for the at least one key portfolio driver to produce a plurality of potential future forecasts for at least one portfolio performance measure.

50. The encoded computer-readable medium of claim 49, wherein the at least one portfolio performance measure is potential revenues.

51. The encoded computer-readable medium of claim 49, wherein the at least one portfolio performance measure is potential losses.

52. The encoded computer-readable medium of claim 49, wherein the at least one portfolio performance measure is potential profits.

53. The encoded computer-readable medium of claim 49, wherein the at least one portfolio performance measure is value at risk.

54. The encoded computer-readable medium of claim 49, wherein the at least one portfolio performance measure is earnings at risk.

55. The encoded computer-readable medium of claim 49, wherein the at least one portfolio performance measure is economic capital.

56. The encoded computer-readable medium of claim 49, wherein the at least one portfolio performance measure is return on capital.

57. The encoded computer-readable medium of claim 49, wherein the at least one portfolio performance measure as return on equity.

58. The encoded computer-readable medium of claim 49, wherein the at least one portfolio performance measure is a risk adjusted performance measurement.

59. The encoded computer-readable medium of claim 41 wherein the selected functional form is additive.

60. The encoded computer-readable medium of claim 41 wherein the selected functional form is multiplicative.

61. A method for modeling a retail lending portfolio comprising:

providing vintage performance data for a retail lending portfolio, wherein the portfolio has at least one key portfolio driver;

selecting a functional form that relates maturation aspects and exogenous aspects of the provided data;

decomposing the provided data using the selected functional form to generate a portfolio maturation component, a portfolio exogenous component and at least one vintage calibration parameter, wherein the portfolio exogenous component includes elements of management action and seasonality;

extracting the elements of management action and seasonality from the portfolio exogenous component to generate a residual exogenous component;

computing monthly changes in the residual exogenous component; measuring autocorrelation in the residual exogenous component; measuring the distribution of monthly changes in the residual exogenous component;

generating a plurality of random potential future scenarios for the residual exogenous component using the measured distribution of monthly changes and the measured autocorrelation;

generating a plurality of potential future scenarios for the exogenous component using the plurality of generated potential future scenarios for the residual exogenous component; and generating a plurality of forecasts for the at least one key portfolio driver using the plurality of exogenous scenarios.

* * * * *